(12) United States Patent
Yamasita

(10) Patent No.: US 7,035,917 B2
(45) Date of Patent: Apr. 25, 2006

(54) DHCP MESSAGE BASED NOTIFICATION SYSTEM WHICH PREVENTS REGISTRATION OF UNAUTHORIZED USERS WHILE CONCURRENTLY PROVIDING AN IP ADDRESS

(75) Inventor: Tetsuya Yamasita, Tokyo (JP)

(73) Assignee: NEC Corporation, Tokyo (JP)

( * ) Notice: Subject to any disclaimer, the term of this patent is extended or adjusted under 35 U.S.C. 154(b) by 642 days.

(21) Appl. No.: 10/090,625

(22) Filed: Mar. 6, 2002

(65) Prior Publication Data

US 2002/0126658 A1 Sep. 12, 2002

(30) Foreign Application Priority Data

Mar. 6, 2001 (JP) .............................. 2001-062533

(51) Int. Cl.
G06F 15/177 (2006.01)

(52) U.S. Cl. ...................................... 709/220; 709/227
(58) Field of Classification Search ................ 709/217, 709/220, 222–223, 225, 227–230; 713/201; 379/40, 56.1–56.3

See application file for complete search history.

(56) References Cited

U.S. PATENT DOCUMENTS 6,684,243 B1 * 1/2004 Euget et al. ................ 709/222
2003/0142805 A1 * 7/2003 Gritzer et al. .......... 379/202.01

FOREIGN PATENT DOCUMENTS

| JP | 09-330284 | * 12/1997 |
| JP | A 9-330284 | 12/1997 |
| JP | A 11-195000 | 7/1999 |
| JP | 2000-092107 | * 3/2000 |
| JP | A 2000-92107 | 3/2000 |
| JP | A 2000-285050 | 10/2000 |
| JP | A 2001-136171 | 5/2001 |
| WO | WO 98/40986 | * 9/1998 |

OTHER PUBLICATIONS

Network Access Control for DHCP Environment, Kobayashi, K. & Yamaguchi, S. INET 97, 7th Annual Conf Internet Society, Jun. 1997, p. 1-6.*

(Continued)

Primary Examiner—Beatriz Prieto
(74) Attorney, Agent, or Firm—Young & Thompson

(57) ABSTRACT

A main unit address restricted notification system has a main unit, two or more subordinate terminals which acquire an IP address of said main unit at a connection start, an address administration unit having a DHCP function, and a transmitting line for connecting these. The address administration unit attaches terminal identification information to a DHCP message from the subordinate terminals to the address administration unit at a connection start and also the address administration unit comprises a terminal identification information authorizing part which authorizes terminal identification information received and a main unit IP address information notifying unit which notifies only terminals which have passed the authorization of main unit IP address information.

8 Claims, 5 Drawing Sheets

OTHER PUBLICATIONS

RFC 3118: Authentication for DHCP Messages, Droms, R., et. al. Jun. 2001, p. 1-17.*

A protection Method against Unauthorized Access and Address Spoofing for Open Network Access Systems, Ishibashi, H., et. al., IEEE 0-7803-7080-5, May 2001, p. 10-13.*

Self-Configuring Networks, Mcauley, A.J., et. al., IEEE 0-7803-6521-6, Jun. 2000, p. 315-319.*

PANS: Public Access Network Station, Imaizumi, T.; Machida, A.; Ishihara, T.; Parallel Processing, 1999. Proceedings. 1999 International Workshops on Sep. 21-24, 1999 page(s):220-225.*

* cited by examiner

DHCP MESSAGE BASED NOTIFICATION SYSTEM WHICH PREVENTS REGISTRATION OF UNAUTHORIZED USERS WHILE CONCURRENTLY PROVIDING AN IP ADDRESS

BACKGROUND OF THE INVENTION

1. Technical Field of the Invention

The present invention relates to a main unit address restricted notification system for notifying an address of a system main unit such as a system control unit when connection of client terminals is started.

2. Description of the Related Art

Priorly, in a network system including network terminals such as local area network (LAN) telephones and network computers (NCs), in a case where, from network terminals to a server for administrating addresses (hereinafter, referred to as a DHCP server), a request for an address of a server for accommodating these network terminals (hereinafter, referred to as an NC server) is made by means of a dynamic host configuration protocol (hereinafter, referred to as a DHCP), if the NC server address has been registered in the DHCP server, the DHCP server unconditionally notifies any network terminals of the NC server address.

As a network system similar to such a LAN telephone system, the following technique has been disclosed in Japanese Unexamined Patent Publication No. 2000-92107.

In the concrete network system, first and second LANs are connected to a network, and furthermore, a directory server is connected thereto. In response to a request for IP address acquisition from an NC connected to the first LAN, a DHCP server, which is similarly connected to the first LAN, assigns an IP address to the NC and also replies with an IP address of the directory server. The NC broadcasts a request for IP address acquisition at start-up, accesses the directory server by using the IP address answered from the DHCP server, and acquires the IP address of the NC server. Then, the NC accesses an NC server on the second LAN by using the IP address acquired and boots a basic program.

As such, the DHCP server notifies the NCs, from which an address request has been made, of the NC server address via the server which has recognized the NC server address and is called a directory server, although it is indirectly performed.

However, in such a prior network system, the NC server address is notified to all of the NCs from which a request has been made, therefore, even an illegally diverted NC can connect to the NC server.

Namely, a problem exists such that authorization is not carried out at the DHCP server and the NC server address is notified to all of the NCs which have made a request for the NC server address.

SUMMARY OF THE INVENTION

An object of the present invention is to provide a main unit address restricted notification system which can improve safety.

A main unit address restricted notification system according to a first aspect of the present invention comprises: a main unit, two or more subordinate terminals which acquire an IP address of said main unit at a connection start, an address administration unit having a DHCP function, and a transmitting line for connecting these. Said main unit address restricted notification system comprises a terminal identification information authorizing part which attaches, to the DHCP message from the subordinate terminals to the address administration unit at a connection start, terminal identification information and also authorizes terminal identification information received at the address administration unit. Said address administration unit comprises a main unit IP address information notifying unit for notifying only terminals which have passed the authorization of main unit IP address information.

Thus, a terminal identification information authorizing part which attaches, to the DHCP message from the subordinate terminals to the address administration unit at a connection start, terminal identification information and also authorizes terminal identification information received at the address administration unit is provided, and this address administration unit notifies only terminals which have passed the authorization of main unit IP address information, whereby the range of acquisition of the main unit IP address is limited to qualified terminals which pass this authorization.

A main unit address restricted notification system according to a second aspect of the invention is characterized in that, in the main unit address restricted notification system according to the first aspect of the present invention, the aforementioned main unit IP address information notification is carried out by attaching, to a DHCP message to terminals which have passed authorization, an assigned IP address and also main unit IP address information and on the other hand, by attaching to a DHCP message to terminals which have failed in authorization, only the assigned IP address.

Thus, main unit IP address information notification is carried out by attaching, to a DHCP message to terminals which have passed authorization, an assigned IP address and also main unit IP address information and on the other hand, by attaching, to a DHCP message to terminals which have failed in authorization, only the assigned IP address, whereby limited notification of main unit IP address information can be carried out by the DCHP.

A main unit address restricted notification system according to a third aspect of the invention comprises: a main unit, two or more subordinate terminals which acquire an IP address of such a main unit at a connection start, an address administration unit having a DHCP function, and a transmitting line for connecting these. On the transmitting line, a terminal identification information authorizing unit for authorizing terminal identification information is provided, and to the DHCP message from the terminal to the address administration unit at a connection start, an IP address request of this terminal identification information authorizing unit is attached and also, the subordinate terminals send terminal identification information to a terminal identification information authorizing unit IP address received from the address administrating means, and the terminal identification information authorizing unit notifies only subordinate terminals which have passed authorization of main unit IP address identification information.

Thus, on the transmitting line, a terminal identification information authorizing unit for authorizing terminal identification information is provided, and to the DHCP message from the terminal to the address administration unit at a connection start, an IP address request of this terminal identification information authorizing unit is attached and also, the subordinate terminals send terminal identification information to a terminal identification information authorizing unit IP address received from the address administrating means, and the terminal identification information authorizing unit notifies only subordinate terminals which have passed authorization of main unit IP address information, whereby the range of acquisition of the main unit IP address is limited to qualified terminals which pass this authorization.

A main unit address restricted notification system according to a fourth aspect of the invention is characterized in that, in the main unit address restricted notification system according to any one of the first through the third aspects of the present invention, the address administration unit comprises a DHCP server and a directory server connected to the transmission line, and the main unit IP address information is an IP address of this directory server.

Thus, the address administration unit comprises a DHCP server and a directory server connected to the transmission line, and the main unit IP address information is an IP address of this directory server, whereby mounting on a system having a DHCP server and a directory server becomes efficient.

A main unit address restricted notification system according to a fifth aspect of the invention is characterized in that, in the main unit address restricted notification system according to any one of the first through the fourth aspects of the present invention, the subordinate terminals are LAN telephone terminals and the main unit is a system control unit, thereby constructing a LAN telephone system.

Thus, the subordinate terminals are LAN telephone terminals and the main unit is a system control unit, whereby the above effects can be obtained in a LAN system.

A main unit address restricted notification system according to a sixth aspect of the invention is characterized in that, in the main unit address restricted notification system according to any one of the first through the fourth aspects of the present invention, said subordinate terminals are network computers and said main unit is an NC server.

Thus, the subordinate terminals are network computers (hereinafter, referred to as NCs) and said main unit is an NC server, whereby the above effects can be obtained in a network computer system.

DETAILED DESCRIPTION OF THE PREFERRED EMBODIMENTS

Hereinafter, a main unit address restricted notification system according to a preferred embodiment of the present invention will be described in detail with reference to the drawings. In the present embodiment, authorization when acquiring a system control unit address from an address administration unit at start-up of a LAN telephone terminal is used.

Figure 1:
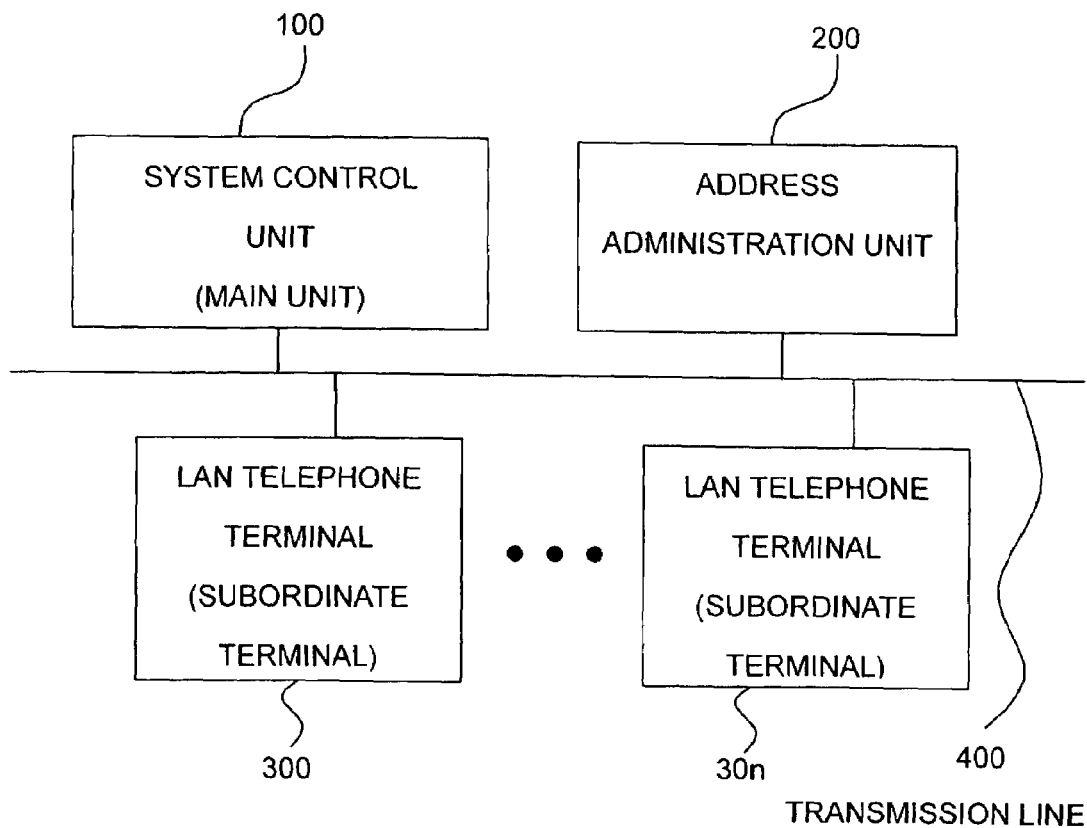
FIG. 1 is a block diagram showing a construction of a first embodiment of the main unit address restricted notification system according to the present invention.
Figure 2:
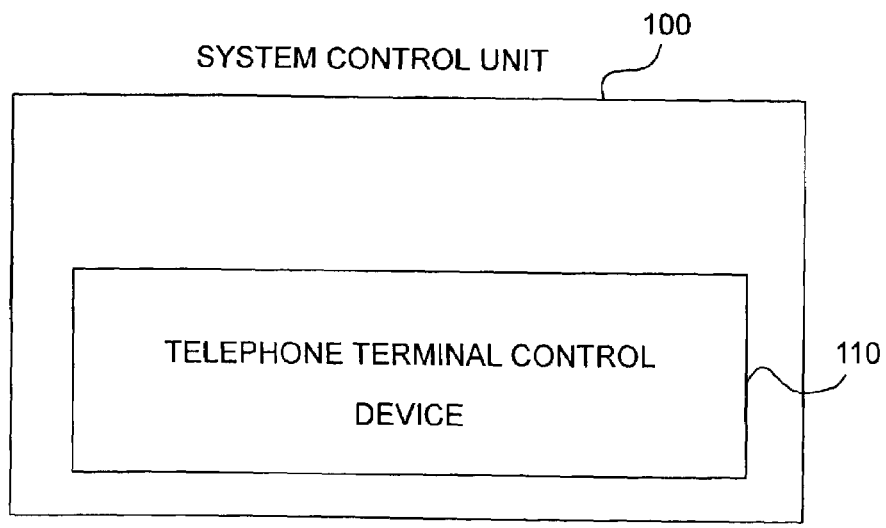
FIG. 2 is a block diagram showing a construction of the telephone terminal control part of the first embodiment of the main unit address restricted notification system according to the present invention.
Figure 3:
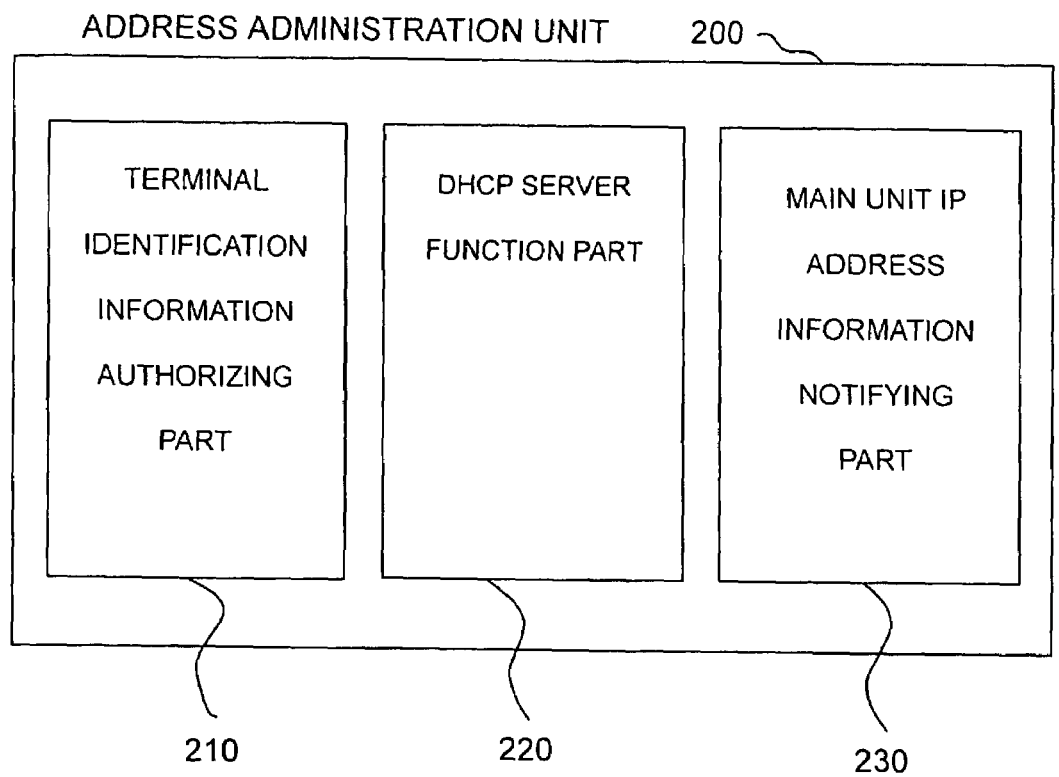
FIG. 3 is a block diagram showing a construction of the address administration unit of the first embodiment of the main unit address restricted notification system according to the present invention.
Figure 4:
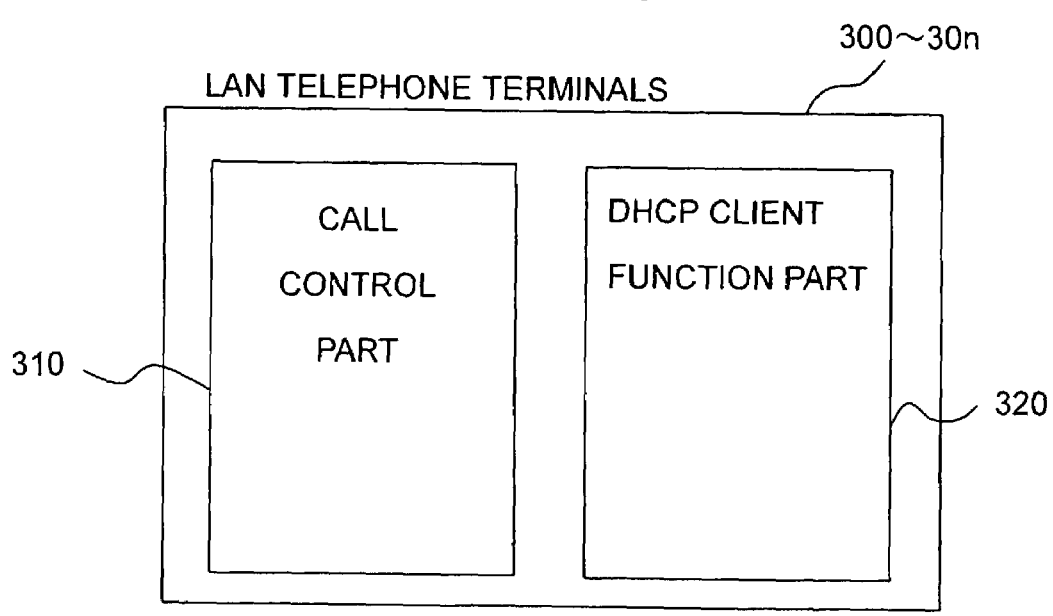
FIG. 4 is a block diagram showing a construction of the LAN telephone terminals of the first embodiment of the main unit address restricted notification system according to the present invention.

FIG. 1 is a block diagram showing a construction of an main unit address restricted notification system of the present embodiment, FIG. 2 is, similarly, a block diagram showing a construction of a telephone terminal control part of the present embodiment, FIG. 3 is, similarly, a block diagram showing a construction of an address administration unit of the present embodiment, and FIG. 4 is, similarly, a block diagram showing a construction of LAN telephone terminals of the present embodiment.

As shown in FIG. 1, in the main unit address restricted notification system using a DHCP function of the present invention, a system control unit 100, an address administration unit 200, and a plurality of LAN telephone terminals 300–30n are connected to a LAN transmission line 400.

As shown in FIG. 2, the system control unit 100 comprises a telephone terminal control part 110, and in the telephone terminal control part 110, a registration process of LAN telephone terminals and telephone controls are performed.

Furthermore, as shown in FIG. 3, the address administration unit 200 comprises a terminal identification information authorizing part 210, a DHCP server function part 200 and a main unit IP address information notifying part 230.

In the terminal identification information authorizing part 210, a judgement is made as to whether terminal identification information to be sent from the LAN telephone terminals 300–30n can be approved in terms of a connection to the system control unit.

In the DHCP server function part 220, to a DHCP client, an IP address assignment and a notification of an IP address of the system control unit are carried out.

The main unit IP address information notifying part 230 notifies only terminals which have passed an authorization of main unit IP address information.

The LAN telephone terminals 300–30n each comprise, as shown in FIG. 4, a call control part 310 and a DHCP client function part 320.

In the call control part 310, terminal registration processing to the system control unit 100 is carried out.

In the DHCP client function part 320, to the DHCP server function part 220, a request for a terminal IP address and an IP address of the system control unit is made.

Now, operations of the main unit address restricted notification system according to the embodiment of the present invention will be described hereinafter in detail with reference to the drawings.

Figure 5:
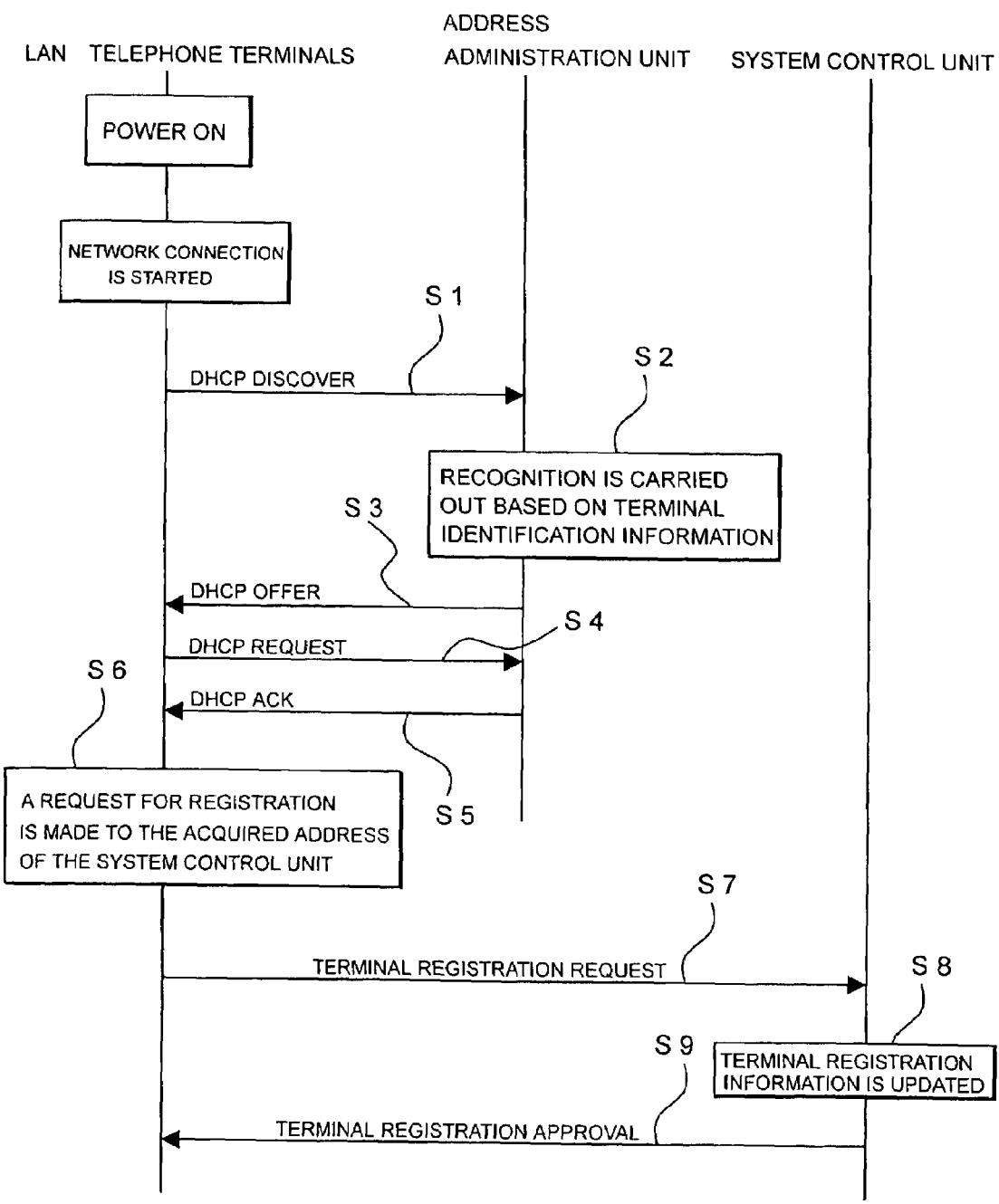
FIG. 5 is a sequence diagram showing operations of the first embodiment of the main unit address restricted notification system according to the present invention.

FIG. 5 is a sequence diagram showing operations of the main unit address restricted notification system according to the present embodiment.

First, to the LAN transmission line 400 to which the system control unit 100 and the address administration unit 200 as shown in FIG. 1, the LAN telephone terminals 300–30n are connected and a power source is turned on.

DHCP client processing is caused to start from the DHCP client function part 320 of the LAN telephone terminals 300–30n, and a DHCP Discover is sent to the address administration unit 200 (step S1).

At this time, the following two options are attached to an option defining field of the DHCP Discover to be sent.

[1] Option ID 53 (parameter request: ID 160 (user-defined option: system control unit address))

[2] Option ID 150 (user-defined option: terminal identification information (example: MAC address))

The address administration unit 200 which has received the DHCP Discover carries out DHCP Discover receiving processing at the DHCP server function part 220 and notifies the terminal identification information authorizing part 210 of the attached terminal identification information of the option ID 150.

In the terminal identification information authorizing part 210, a judgement is made as to whether or not the notified terminal identification information can be approved (step S2).

Namely, the terminal identification information authorizing part 210 judges as to whether or not terminal identification information exists and judges, in the case of a MAC address, based on a vendor code and the like, whether the identification information is not of another company.

After judgement, the terminal identification information authorizing part 210 notifies the DHCP server function part 220 of approval/disapproval, and in a case of approval, the DHCP server function part sends the LAN telephone terminals 300–30n a DHCP Offer to which an IP address to be assigned and the option ID 160 (user-defined option: system control unit address) in the option defining field are attached (step S3).

In a case of disapproval, the DHCP server function part 220 attaches, to the DHCP Offer, only the IP address to be assigned and sends this to the LAN telephone terminals 300–30n.

The LAN telephone terminals 300–30n which have received the DHCP Offer carry out DHCP Offer receiving processing at the DHCP client function part 320 and shifts to processing for sending a DHCP Request (step S4).

To the DHCP Request, the two options which have been attached to the DHCP Discover are attached with the same contents, and this DHCP Request is sent to the address administration unit 200.

The address administration unit 200 which has received the DHCP Request carries out DHCP Request receiving processing at the DHCP server function part 220, notifies the attached terminal identification information of the option ID 150 of the terminal identification information authorizing part 210, and carries out processing similar to the case of the DHCP Discover.

In a case of approval, a DHCP Ack to which an IP address to be assigned is attached and also has an option ID 160 (user-defined option: system control unit address) attached to the option defining field is sent to LAN telephone terminals 300–30n (step S5).

In a case of disapproval, only the IP address to be assigned is attached to the DHCP Ack and this is sent to the LAN telephone terminals 300–30n.

The LAN telephone terminals 300–30n which have received the DHCP Ack carries out DHCP Ack receiving processing at the DHCP client function part 320 and sets a terminal IP address (step S6).

Of the LAN telephone terminals 300–30n, LAN telephone terminals which can acquire the system control unit address set the acquired system control unit address as a terminal registry.

Then, of the LAN telephone terminals 300–30n, terminals which have acquired the IP address and system control unit address send, by processing at the call control part 310, a terminal registration request to the system control unit 100 (step S7).

The system control unit 100 which has received the terminal registration request carries out registration processing at the telephone terminal control unit 110 and updates terminal registration information (step S8). Then, the system control unit 100 sends terminal registration approval to the LAN telephone terminals as senders (step S9).

In the above, registration of the LAN telephone terminals is completed, and telephone operations become possible. LAN telephone terminals which have not received the terminal registration approval cannot perform telephone operations.

Figure 6:
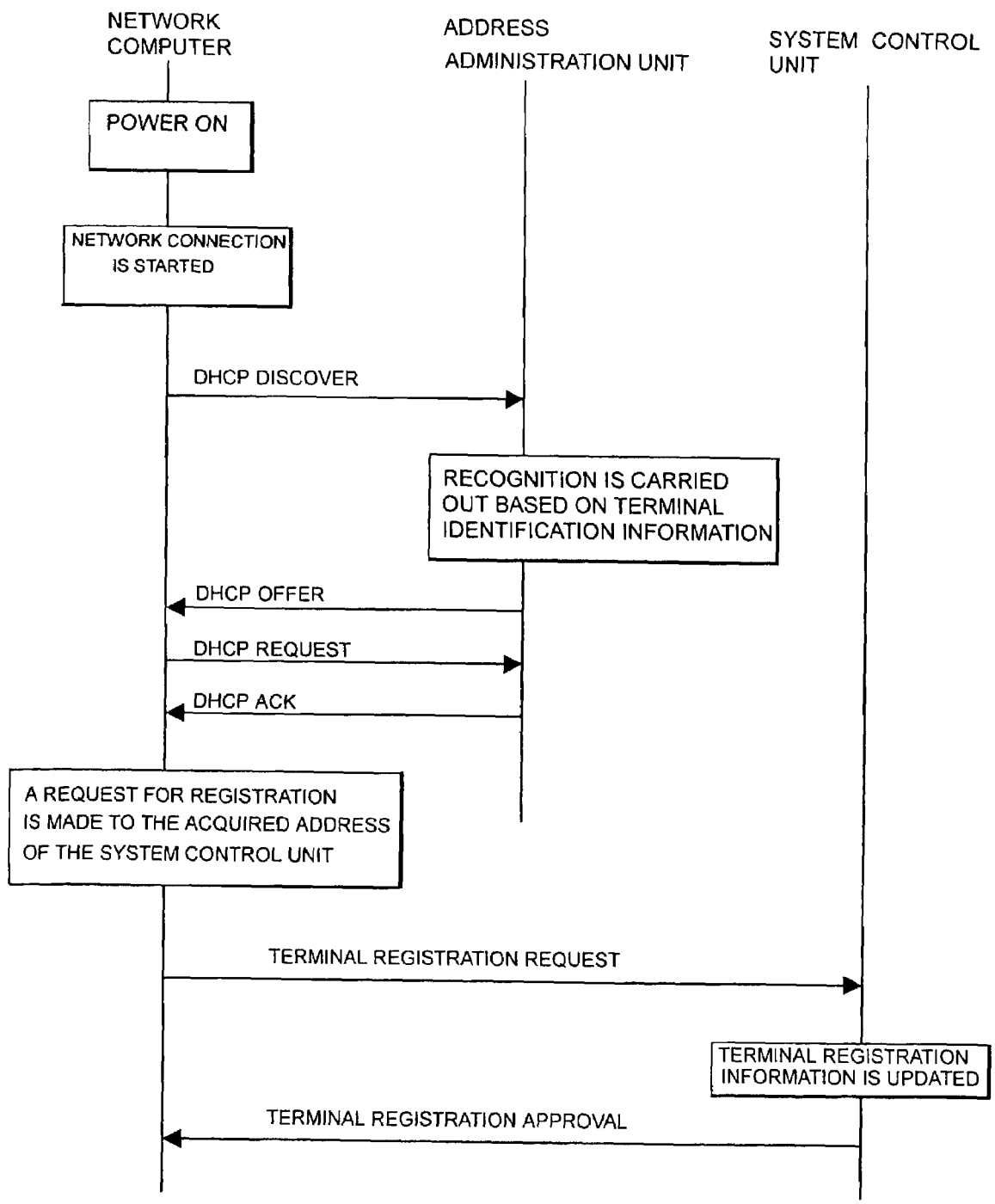
FIG. 6 is a sequence diagram showing operations of a second embodiment of the main unit address restricted notification system according to the present invention.

Next, a second embodiment of the present invention will be described referring to FIG. 6. FIG. 6 is a sequence diagram showing operations of the main unit address restricted notification system according to the second embodiment. The present embodiment is for a case where network computers are connected to a network instead of LAN telephone terminals.

In a network to which a system control unit and an address administration unit for administrating computers (hereinafter, NCs) to be connected to a network, first, the NCs when being connected make an address request for NCs to an address administration unit by means of a DHCP.

At this time, a system control unit address request and notification of identification information for authorization are also attached to a DHCP message.

The address administration unit which has received the request through the DHCP authorizes the identification information and simultaneously carries out, in response to a request judged to be approval through the authorization, assignment of addresses for NCs and a notification of an address of the system control unit.

In response to a request judged to be disapproval through the authorization, only assignment of an IP address is carried out.

Only NCs which can acquire the system control unit address can connect to the system control unit.

Figure 7:
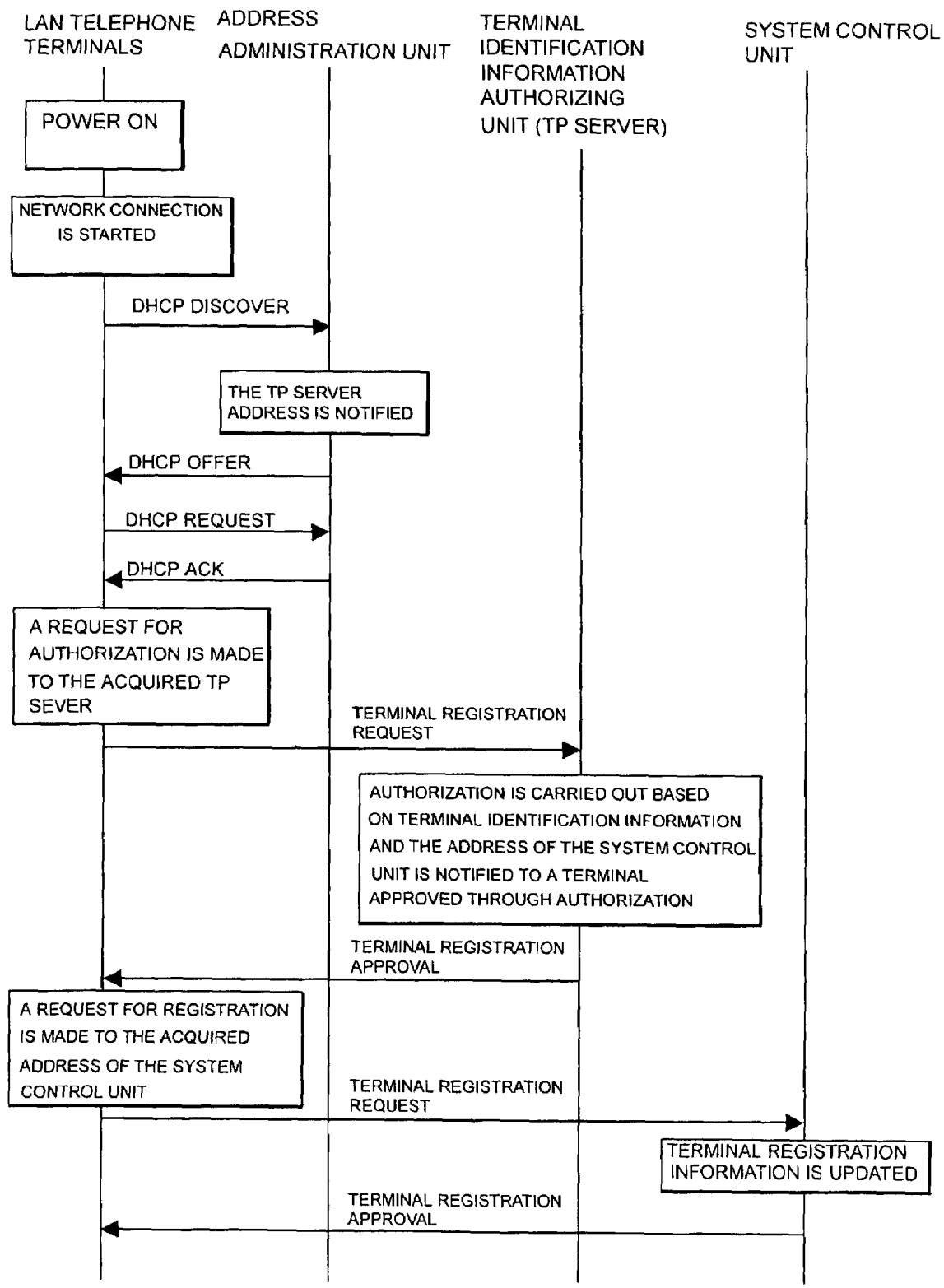
FIG. 7 is a sequence diagram showing operations of a third embodiment of the main unit address restricted notification system according to the present invention.

Now, a third embodiment of the present invention will be described referring to FIG. 7. FIG. 7 is a sequence diagram showing operations of the main unit address restricted notification system according to the third embodiment. The present embodiment is for a case where authorization based on terminal identification information, which has been carried out by the address control unit in the aforementioned embodiments, is carried by a different unit.

In a transmission line to which a system control unit for administrating LAN telephone terminals, an address administration unit having a DHCP function, and a terminal identification information authorizing unit (hereinafter, referred to as a TP server) are connected, LAN telephone terminals make, when being connected, first, an address request for their own terminals to an address control unit, by means of a DHCP.

At this time, a TP server address request is attached to the DHCP message.

The address administration unit which has received the request through the DHCP carries out, to LAN telephone machines from which a request was made, assignment of addresses and notification of an address of the TP server.

Then, the LAN telephone terminals send, for carrying out authorization processing, identification information to the TP server.

The TP server which has received the identification information authorizes the identification information and sends, in response to a request judged to be approval through approval of an address of the system control unit, ACK (approval of authorization) and also makes notification of an address of the system control unit.

In response to a request which is judged to be disapproval, NACK(disapproval authorization) is sent.

Only LAN telephone terminals which can acquire the system control unit address can connect to the system control unit.

As has been described above, according to the present invention, in the case where connection to the system control unit cannot be approved based on terminal identification information, the system control unit address is not notified from the address administrating unit, therefore, LAN telephone terminals cannot acquire the address of the system control unit, whereby terminal registration with the system control unit can be prevented.

That is, to LAN telephone terminals which failed in authorization, telephone operations under the system control unit can be prevented.

What is claimed is:

1. A main unit address restricted notification system comprising:
    a main unit,
    two or more subordinate terminals which send, for acquiring an IP address of said main unit at a connection start, a DHCP message to which terminal identification information is attached at a connection start,
    an address administration unit having a terminal identification information authorizing part which authorizes terminal identification information attached to said DHCP message and a DHCP server function part which notifies only terminals which have passed the authorization of IP address information, and
    a transmitting line which connects said main unit, said subordinate terminals, and said address administration unit,
    wherein said DHCP server function part attaches an assigned IP address and also main unit IP address information to a DHCP message to terminals which have passed authorization and attaches only the assigned address IP address to a DHCP message to terminals which have failed in authorization.

2. A main unit address restricted notification system as set forth in claim 1, wherein
    said address administration unit comprises a DHCP server and a directory server connected to said transmission line, and
    said main unit IP address information is an IP address of said directory server.

3. A main unit address restricted notification system as set forth in claim 1, wherein
    said subordinate terminals are LAN telephones and said main unit is a system control unit, thereby constructing a LAN telephone system.

4. A main unit address restricted notification system as set forth in claim 1, wherein
    said subordinate terminals are network computers and said main unit is an NC server.

5. A main unit IP address restricted notification system, comprising:
    a main unit,
    two or more subordinate terminals which acquire an IP address of said main unit at a connection start,
    an address administration unit having a DHCP server function part,
    a terminal identification information authorizing unit, in which at a connection start of said subordinate terminals, a DHCP message on which an IP address request of said terminal information identification authorizing unit is attached is sent from said subordinate terminals to said address administration unit, said subordinate terminals send terminal identification information to a terminal identification information authorizing unit IP address received from said address administration unit, said terminal identification information authorizing unit authorizes said received terminal identification information and notifies only subordinate terminals which have passed the authorization of a main unit IP address information, and
    a transmitting line which connects said main unit, said subordinate terminals, and said address administration unit,
    wherein said DHCP server function part attaches an assigned IP address and also main unit IP address information to a DHCP message to terminals which have passed authorization and attaches only the assigned address IP address to a DHCP message to terminals which have failed in authorization.

6. A main unit address restricted notification system as set forth in claim 5, wherein
    said address administration unit comprises a DHCP server and a directory server connected to said transmission line, and
    said main unit IP address information is an IP address of said directory server.

7. A main unit address restricted notification system as set forth in claim 5, wherein
    said subordinate terminals are LAN telephones and said main unit is a system control unit, thereby constructing a LAN telephone system.

8. A main unit address restricted notification system as set forth in claim 5, wherein
    said subordinate terminals are network computers and said main unit is an NC server.

* * * * *